(12) United States Patent
Bou-Ghannam et al.

(10) Patent No.: US 8,352,962 B2
(45) Date of Patent: *Jan. 8, 2013

(54) MANAGING APPLICATION INTERACTIONS USING DISTRIBUTED MODALITY COMPONENTS

(75) Inventors: Akram A. Bou-Ghannam, Lake Worth, FL (US); Gerald M. McCobb, Delray Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/334,308

(22) Filed: Dec. 22, 2011

(65) Prior Publication Data

US 2012/0096108 A1    Apr. 19, 2012

Related U.S. Application Data

(63) Continuation of application No. 12/135,651, filed on Jun. 9, 2008, now Pat. No. 8,095,939, which is a continuation of application No. 10/741,499, filed on Dec. 19, 2003, now Pat. No. 7,401,337.

(51) Int. Cl.
*G06F 3/00* (2006.01)
*G06F 9/44* (2006.01)
*G06F 9/46* (2006.01)
*G06F 13/00* (2006.01)

(52) U.S. Cl. .......................... 719/318; 719/320; 704/231

(58) Field of Classification Search .................. 719/318, 719/320; 704/270.1, 231
See application file for complete search history.

(56) References Cited

U.S. PATENT DOCUMENTS

| 5,748,974 | A | 5/1998 | Johnson |
| 5,878,274 | A | 3/1999 | Kono et al. |
| 6,529,863 | B1 | 3/2003 | Ball et al. |
| 6,859,451 | B1 | 2/2005 | Pasternack et al. |
| 6,990,513 | B2 | 1/2006 | Belfiore et al. |
| 7,069,560 | B1 | 6/2006 | Cheyer et al. |
| 7,409,349 | B2 * | 8/2008 | Wang et al. ................. 704/270.1 |

OTHER PUBLICATIONS

W3C, "Multimodal Interaction Requirements", Jan. 8, 2003, pp. 1-40.
Yang, et al., "Smart Sight: A Tourist Assistant System", 1999.
Amann et al., "Position Statement for Multi-Modal Access", Nov. 26, 2001, pp. 1-16.

* cited by examiner

*Primary Examiner* — Diem Cao
(74) *Attorney, Agent, or Firm* — Wolf, Greenfield & Sacks, P.C.

(57) ABSTRACT

A method for managing multimodal interactions can include the step of registering a multitude of modality components with a modality component server, wherein each modality component handles an interface modality for an application. The modality component can be connected to a device. A user interaction can be conveyed from the device to the modality component for processing. Results from the user interaction can be placed on a shared memory are of the modality component server.

18 Claims, 3 Drawing Sheets

MANAGING APPLICATION INTERACTIONS USING DISTRIBUTED MODALITY COMPONENTS

CROSS REFERENCE TO RELATED APPLICATIONS

This Application is a continuation of U.S. application Ser. No. 12/135,651, entitled "MANAGING APPLICATION INTERACTIONS USING DISTRIBUTED MODALITY COMPONENTS" filed on Jun. 9, 2008, which is a continuation of U.S. application Ser. No. 10/741,499, entitled "MANAGING APPLICATION INTERACTIONS USING DISTRIBUTED MODALITY COMPONENTS" filed on Dec. 19, 2003, now U.S. Pat. No. 7,401,337, each of which is incorporated by reference herein in its entirely.

BACKGROUND

1. Field of the Invention

The present invention relates to the field of computer software and, more particularly, to multimodal applications.

2. Description of the Related Art

A multimodal application is an application that permits user interactions with more than one input mode. Examples of input modes include speech, digital pen (handwriting recognition), and the graphical user interface (GUI). A multimodal application may, for example, accept and process speech input as well as keyboard or mouse input. Similarly, a multimodal application may provide speech output as well as visual output, which can be displayed upon a screen. Multimodal applications can be particularly useful for small computing devices possessing a form-factor that makes keyboard data entry more difficult than speech data entry. Further, environmental conditions can cause one interface modality available in a multimodal application to be preferred over another. For example, if an environment is noisy, keypad and/or handwritten input can be preferred to speech input. Further, when visual conditions of an environment, such as darkness or excessive glare, make a screen associated with a computing device difficult to read, speech output can be preferred to visual output.

Although users of small computing devices can greatly benefit from multimodal capabilities, small computing devices can be resource constrained. That is, the memory and processing power available to a small computing device can be too limited to support the local execution of more than one mode of interaction at a time. To overcome resource constraints, multimodal processing can be distributed across one or more remote computing devices. For example, if one mode of interaction is speech, speech recognition and synthesis processing for the speech mode can be performed upon a speech-processing server that is communicatively linked to the multimodal computing device. Software developers face a significant challenge in managing distributed multimodal interactions, some of which can be executed locally upon a computing device, while other interactions can be executed remotely.

Conventional solutions to distributed multimodal interaction management have typically been application specific solutions that have been designed into an application during the application's software development cycle. Accordingly, the features available for each modality, such as speech recognition features, are typically tightly integrated within the software solution so that future enhancements and additional features can require extensive software rewrites. Because hardware and software capabilities are constantly evolving in the field of information technology, customized solutions can rapidly become outdated and can be costly to implement. A more flexible, application-independent solution is needed.

SUMMARY OF THE INVENTION

The present invention provides a method, a system, and an apparatus for managing a multimodal application using a set of activation conditions and data placed on a shared memory area, where one set of application conditions are defined by an application developer. More specifically, a multitude of modular modality components can be provided, each of which can perform tasks for a particular modality. Each input modality supported by the application can be handled by a modality component. Particular ones of the modality components and/or portions thereof can be local to the multimodal application, while others can be remotely located from the application. The multimodal application can communicate with a resource constrained thin client capable of locally executing a limited subset of available modalities at any one time.

The multimodal application can selectively utilize registered modality components in a dynamic manner as needed. For example, a speech recognition component can be fired and connected directly to the thin client to perform text output and input recognition tasks. The results of the speech input recognition are placed on the shared memory area.

It should be noted that each modality component can place its own set of activation conditions and data on a shared memory area of the modality component server. The set of activation conditions submitted by modality component defines how it can be activated, and how input and output between the modality component and the client device can be started and stopped. A special modality component, called the application module, can be used to add and remove authored activation conditions. The application module can also be activated based an occurrence of one of the application conditions that was in turn initiated by an application event. The activation conditions defined for the application in combination with the state of objects in shared memory can be used to select different modality components as needed to perform input recognition and output synthesis, as well as to interpret data submitted by multiple modality components for complex multimodal interactions.

One aspect of the present invention can include a method for managing multimodal interactions. The method can include the step of registering a multitude of modality components, wherein each modality component can handle an interface modality for an application. In one embodiment, one or more of the modality components can be remotely located from a device. Further, the device can lack the resources to locally execute at least one function that is handled by the remotely located modality component. The device can also contain one or more locally disposed modality components. Once the multimodal application has been instantiated and modality components registered, a registered modality component can be activated and connected to the device. Once connected to the device, a user interacts with the device and the connected modality. The results of the interaction are placed on the shared memory area of the modality component sewer.

In one embodiment, a list of activation conditions can be established for each modality component. Appropriate modality components can be utilized whenever one of the listed activation conditions is detected. In another embodiment, the method can detect a condition that indicates that one of the registered components is required. Upon detecting this condition, the registered modality component can be used to perform a programmatic action.

Another aspect of the present invention can include a modality component server that includes a modality activator, a multimodal engine, and/or a modality interface. The modality activator can manage proxies residing on the server for each of the modality components. The modality activator can also dynamically disconnect the modality component from the device and deactivate the modality component responsive to a completion of an interaction response. The modality interface can standardize data exchanged between modality components and the multimodal application.

The multimodal engine includes an inference engine, a list of activation conditions, and a shared memory area. The inference engine matches the activation conditions to the current state of the shared memory area. The activation condition that matched may activate an appropriate modality component, or activate the application module as part of a complex multimodal interaction. A multimodal interaction may involve more than one modality component. The multimodal engine can detect an interaction specified by a modality component and can responsively initiate an interaction response, which can also be specified by the modality component. The multimodal engine can detect interactions defined by any modality component and initiate appropriate interactions defined by any modality component and initiate appropriate actions upon detecting the interactions. The multimodal engine can manage multimodal interactions involving multiple modality components.

In another embodiment, the application can be accessed remotely from a thin client. The thin client can lack sufficient resources to simultaneously enable a set of interface modalities supported by the multimodal application. That is, substantial resources are not consumed on the thin client because the modality overhead is handled remotely by the modality component server and modality components. The thin client can utilize any of the modalities supported by the multimodal application by having the modality component server activate the modalities that the device supports.

In another embodiment, the multimodal engine can manage complex multimodal interactions that involve more than one multimodal component. Each multimodal component can place the results of its interaction with the user on the multimodal engine's shared memory area. Each result can be placed on the shared memory area as an object that can contain various properties, such as timestamps and confidence levels. The inference engine can run a list of activation conditions against a current list of objects in the shared memory area. One or more activation conditions that match the current state of the shared memory area can be selected. An activation condition submitted by the application module may be one of those selected.

The application module can resolve a multimodal interaction involving multiple modality components. The application's activation condition can resolve the references to missing data in one of the modality component's submitted results, where the missing information can be contained in the results submitted by another modality component. For example, the activation condition may be, "if speech object has "here" in it, and if a digital pen gesture object is added to the shared memory area within five seconds, activate the application module."

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

Figure 1:
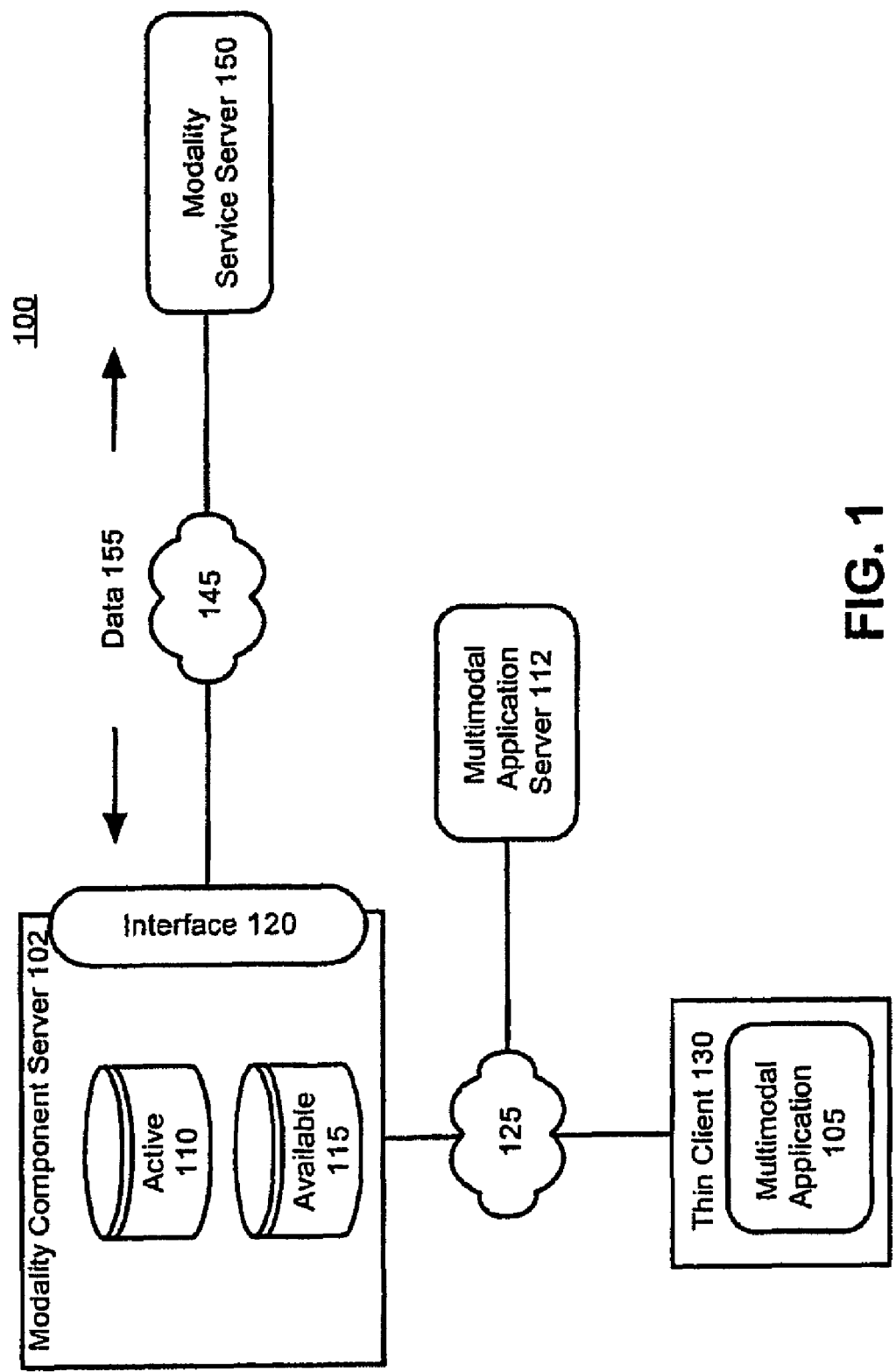
FIG. 1 is a schematic diagram illustrating a system for handling application modalities in a modular fashion in accordance with the inventive arrangements disclosed herein.

FIG. 1 is a schematic diagram illustrating a system 100 for handling application modalities using dialog states of the application in accordance with the inventive arrangements disclosed herein. The system 100 can include a modality component server 102, a modality service server 150, a thin client 130, and a multimodal application server 112.

The thin client 130 can be a computing device of limited capabilities that can rely upon one or more backend servers to perform at least a portion of its processing tasks. The thin client 130 can be, for example, a personal data assistant (PDA), a cellular telephone, an electronic book, an electronic contact manager, a data tablet, and any other such computing device. The thin client 130 can lack sufficient resources to simultaneously enable a set of interface modalities supported by a multimodal application 105 operating upon the thin client 130. The thin client 130 can report the input modes that it supports to a modality component dedicated to the configuration of the device running the application. Information supplied by the thin client 130 can then be submitted to the modality component server 102. Those modality components that support the input modes supported by the device can be dynamically activated and deactivated by the modality component server 102 as needed.

Each modality can represent a particular input or output methodology. For example, graphical user interface (GUI) based modalities can-include, but are not limited to, a keyboard input modality, a mouse selection modality, a screen touch modality, a visual display modality, and the like. Speech based modalities can include a speech input modality, a synthetic speech generation modality, a Dual Tone Multiple Frequency (DTMF) modality, and the like.

The multimodal application 105 can be a software application, which supports interactions via more than one modality. In one embodiment, the multimodal application 105 can by a stand-alone, local application residing upon the thin client 130. In another application, the multimodal application 105 can be a client-side module that interacts with the multimodal application server 112. The multimodal application server 112 can be a remotely located application that manages a portion of the processing tasks relating to the multimodal application 105. The multimodal application server 112 will typically be used in situations where resources directly provided by the thin client 130 are very limited compared to the computing resource required for application operations.

The modality component server 102 can manage a plurality of modalities that have been modularly implemented so that the functions and features for a particular modality can be contained within a specifically designed modality component. When a modality component is activated, the component can interact directly with the device for input recognition and output synthesis. Different modality components used by the modality component server 102 can be executed to interact with the device from different locations. For example, a modality component can be locally executed with respect to the modality component server 102, a modality component or portions thereof can be remotely executed upon the modality service server 150, and/or a modality component can be executed upon the thin client 130. The modality component server 102 can coordinate actions and events relating to the multimodal application 105, regardless of where the modality component is located.

The modality component server 102 can include a set of active modalities 110 and a set of available modalities 115 that are not presently active. The modality component server 102 can process events and match the activation conditions of the modality components with the current state of a shared memory area. As a result of the matching, modality components are activated. One particular modality component is the application module. The application model utilizes modality component objects placed in a shared memory area to respond to user events.

The modality service server 150 can assign modality processing tasks to a modality component from a remote location. The modality service server 150 can convey data 155 across a network 145 to the modality component server 102 and/or the multimodal application 105. In one embodiment, the modality service server 150 can provide a Web service for a specified modality component. The Web service can be, for example, a natural language comprehension service, a text-to-speech service, a language translation service, and the like.

In another embodiment, the modality service server 150 can include a multitude of functions available through remote procedure call (RPC) routines. It should be appreciated that the data 155 provided by the modality service server 150 can be conveyed in any of a variety of manners and the invention is not to be limited in this regard. For example, message queuing and advanced program-to-program communications (APPC) can be used to convey the data 155 to the multimodal application 105 and/or the modality component server 102. The interaction data transferred between the modality component and the device can also be encoded into a compression format.

In one embodiment, the modality component server 102 can include an interface 120 used to standardize data conveyances. The interface 120 can define rules, data formats, parameters, and the like for complying with the architecture of the multimodal application 105 and/or the modality component server 102. Any of a variety of routines, libraries, data adaptors, networking mechanisms, and the like can be included within the interface 120 to facilitate the exchange of data.

For example, in one embodiment, the interface 120 can include an application program interface (API) defined for the multimodal application 105 and/or the modality component server 102. In another embodiment, the interface 120 can convert responses received from the modality service server 150 from a format native to the modality service server 150 to a format compatible with the multimodal application 105. In yet another embodiment, the interface 120 can include a plurality of protocol adaptors to establish network communications with the modality service server 150.

In operation, a multitude of modality components provided from different locations can register with the modality component server 102, thereby becoming available 115 modality components. One of these modality components can include an application module. When the modality component is registered, details for the modality component including links for activating a modality component and firing modality component routines can be specified. Registered modality components can include an application module provided by a multimodal application server 102 and device configuration module provided by the thin client 130. In one embodiment, the resource requirements specified within the application module and the resources available as specified through the device configuration module can be used by the modality component server 102 when selecting which available 115 modality components are to become active 110.

After modality components have been registered with the modality component server 102, the thin client 130 can instantiate the multimodal application 105. A multitude of available 115 modality components can become active 110 components for the application instance. An active 110 modality component is one having a multitude of software objects enabled, where each software object controls one or more modality tasks, as well as communication to the device to directly handle user interaction. Modality software objects can be placed in a shared memory area or "white board" of the modality component server 102. The different software objects within the shared memory area can be used to coordinate application interactions between the modality components.

For example, an initial modality component, such as a GUI modality component, can be activated based upon an initial dialogue state of the multimodal application 105. When activated within the modality component server 102, the GUI modality can be added to the active modalities 110 and events specified for the GUI modality component can be monitored. During the lifetime of the application, one or more GUI software objects provided by the GUI modality component can be added to the shared memory area. Data necessary to execute GUI modality functions for the multimodal application 105 can then be enabled upon the thin client 130. Enabling these GUI modality functions can involve adding software objects for the application to the shared memory area.

Input and output data relating to user interactions are transferred directly between the thin client 130 and the modality component 110. Each of these user interactions may have results that can be compared against activation conditions. The activation conditions are run by the inference engine after one of the various software objects of the various modality components is enabled within the shared memory area. The activation conditions that fire programmatic actions can be dynamically adjusted as different software objects are placed within the shared memory area.

Figure 2:
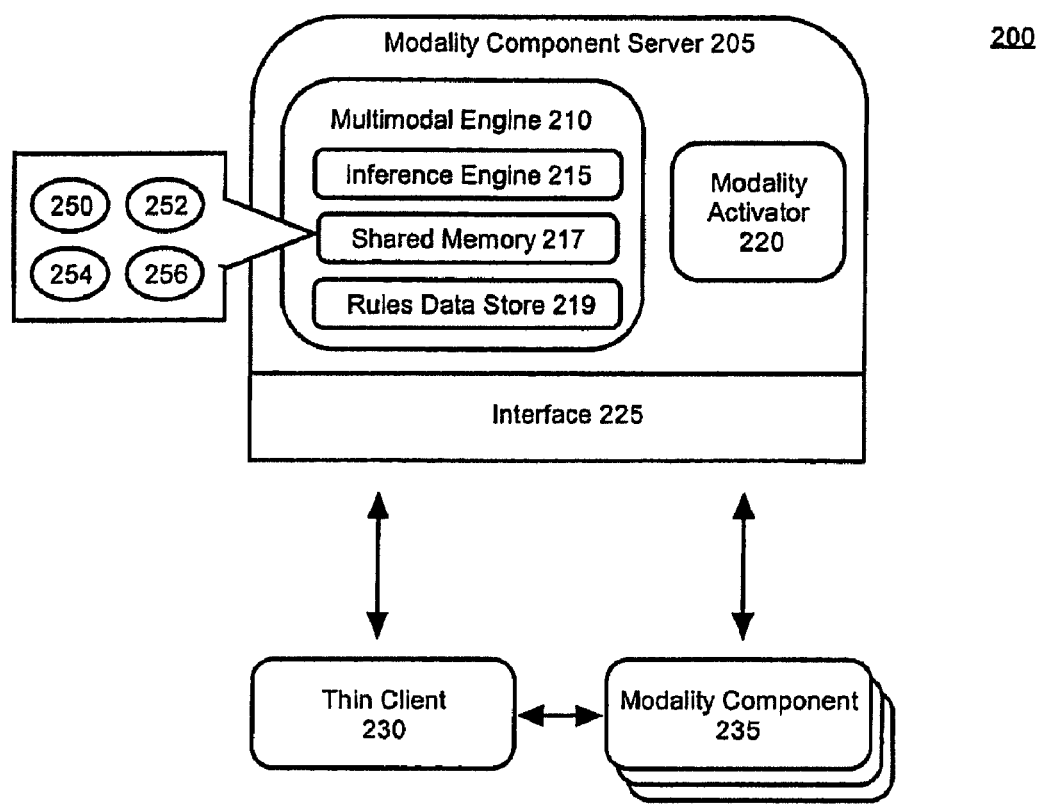
FIG. 2 is a schematic diagram illustrating a system for a multimodal application that manages distributed modality components in accordance with the inventive arrangements disclosed herein.

FIG. 2 is a schematic diagram illustrating a system 200 for a multimodal application that manages distributed modality components in accordance with the inventive arrangements disclosed herein. The system 200 can include a thin client 230, and at least one modality component 235, and a modality component server 205. The thin client 230 can possess the structural characteristics and functions ascribed to the thin client 130 of FIG. 1. In one embodiment, device specific information concerning the thin client 230 can be conveyed to the modality component dedicated to the device's configuration. This modality component in turn can convey the configuration data to the modality component server 205 so that suitable device specific parameters can be established and behavior of the modality component server 205 adjusted in a device specific manner.

The modality component 235 can be a modular software unit that handles interactions relating to a particular modality for a multimodal application executed upon the thin client 230. The modality component 235 can include, but is not limited to, a speech component, a handwriting component, a DTMF component, a keypad entry component, a GUI component, and the like. Collaborations that can exist between different modality components 235 are handled by the modality component server 205. For example, a speech component can perform a speech recognition task resulting in a speech input being converted into textual output. The textual output can be displayed within a GUI text element, which is displayed using features of a GUI component. An application module can also be provided, which is also a modality component.

Each of the modality components 235 can be registered with the modality component server 205. Registration can provide the modality component server 205 with information necessary to dynamically activate the modality components 235 as needed. The modality component 235 can be local to the modality component server 205 and/or thin client 230 or the modality component 235 can be remotely located.

The modality component server 205 can be a software application, which supports coordinate interactions of a multimodal application running upon a resource restricted thin client 230. The modality component server 205 can include an interface 225, a multimodal engine 210, and a modality activator 220.

In one embodiment, the interface 225 can possess the structural characteristics and functions ascribed to the interface 120 of FIG. 1. The interface 225 can be used to facilitate the conveyance of interaction data between the modality component 235 and the modality component server 205.

The modality activator 220 can be used to dynamically activate and/or deactivate the modality components 235 as appropriate. For example, the modality activator 220 can be a listener within an event/listener pattern that can trigger operations of modality components based on matches occurring within the interference engine 215. That is, the modality activator 220 can initiate one or more proxy clients that managing operations of registered modality components.

The multimodal engine 210 can include an inference engine 215, a shared memory area 217, and a rule data store 219. The shared memory area 217 can be a common memory space in which modality objects 250, 252, 254, and 256 are placed. Each of the modality objects can represent a software object provided by a specific modality component 235. Different activation conditions can be loaded into/removed from the multimodal engine 210 by the application module in accordance with the dialogue state of the application as specified by modality objects enabled within the shared memory area 217. When a modality component 235 is deactivated, the modality objects associated with the modality component 235 can be removed from the shared memory area 217.

A multitude of activation conditions specified within the activation condition data store 219 can cause operations of modality objects that have been placed in the shared memory area 217 to be executed. Interaction events can trigger the firing of modality operations associated with specified activation conditions. These operations include, for example, text to speech output and enabling input recognition for a speech modality component.

The inference engine 215 runs application conditions in the activation condition data store 219 in response detection of the application events. An application event can be an assertion of new data, such as an interpretation of user input, by a multimodality component 235. For example, an application event can be an on-focus event or a mouse-click event resulting from a user interaction within a particular modality. The application event can also be a system event. For example, a system event can be triggered whenever the resources available to the modality component server 205 fall below a designated threshold. The modality component server 205 can update and modify the events data contained within inference engine 215 in accordance with the modality objects contained enabled within the shared memory area 217.

All active modality components 235 assert a modality event when they update the shared memory area 217. In response to the modality event, the inference engine 215 runs the activation conditions stored in the activation condition data store 219 against the current state of the shared memory area 217. Those activation conditions that match the current state of the shared memory area are fired. The appropriate responses to the events are thereby determined by the multimodal engine 210. That is, the multimodal engine 210 can detect the occurrence of events specified by active modality components and the appropriate responses for these events can be specified by the inference engine 215. The responses determined by the inference engine 215 can sometimes result in the activation of a previously deactivated modality component and the execution of one or more methods provided by the newly activated modality component.

One illustrative example showing the system 200 in operation involves a multimodal auto travel application deployed in the thin client 230, such as a personal data assistant (PDA). In the example, a series of modality components 235 including an application modality component provided by an application server can be registered with the modality component server 205. Registration can include establishing a set of application conditions for triggering operations of objects that each modality component 235 can place in the shared memory area 217.

A communication channel can be established between the thin client 230 and the modality component server 205. A user interaction can satisfy one or more activation conditions resulting in an operation of a modality being executed. A communication connection can be established between the modality component and the modality component server 205. The modality component server 205 can coordinate the interactions relating to the auto travel application.

For example, a geographical map can be presented within the PDA and a user can use a digital pen to circle an area of the map. Additionally, a user can speak a phase, such as "find all restaurants located here." Data representing the digital pen action can be first conveyed to the handwriting modality component 235. The handwriting modality component interprets the digital pen interaction and responsively places a software object 250 within the shared memory area 217. The software object 250 can define an area of the map that the user circled.

Data representing the speech input can also be conveyed to a speech modality component 235. This speech input can be submitted by the application module as an object placed within the shared memory area. The speech modality component is activated after the inference engine 215 runs the activation conditions against the current state of the shared memory area 217.

An activation condition contained within the activation condition data store 219 can be specified to resolve a multimodal interaction involving multiple modality components. The activation condition is triggered when a speech input is received within a designated time of the receipt of a digital pen input. The firing of this activation condition can result in the placement of software object 254 into the shared memory area 217, where software object 254 can be an object placed as a result of determining the context of spoken pronouns and other such phrases.

For example, the activation condition can associate the word "here" with the area defined by the digital pen. The result of firing the activation event is to locate restaurants within the circle. Once located, the application can place software object 256 in the shared memory area 217. The software object 256 can annotate restaurant locations on appropriate areas of a graphical map. Once the map has been constructed, the GUI modality component can be used to convey the map to the thin client 230. The resulting map can visually depict the location of all restaurants within the previously circled area of the map.

Figure 3:
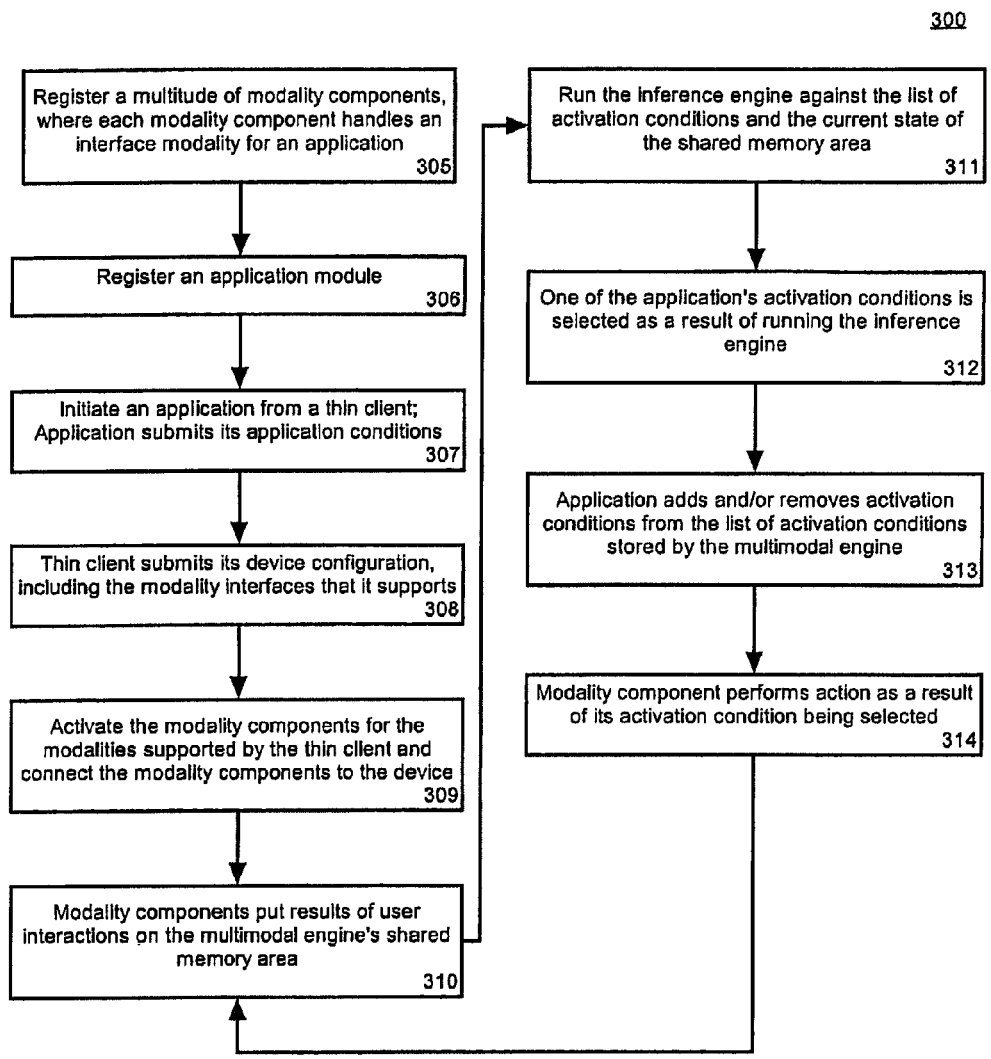
FIG. 3 is a flow chart illustrating a method for managing multimodal interactions in accordance with the inventive arrangements disclosed herein.

FIG. 3 is a flow chart illustrating a method 300 for managing multimodal interactions in accordance with the inventive arrangements disclosed herein. The method 300 can be performed in the context of a modular multimodal application that manages distributed modality components. The method can begin in step 305, where a multitude of modality components can be registered. Each modality component can handle a particular interface modality for the application. Different modality components can be provided by different suppliers for each modality. In step 306, an application module can be registered.

In step 307, the application can be initiated from a thin client. The application submits its activation conditions to the multimodal engine. In step 308, the thin client submits its device confirmation, including the modality interfaces it supports. In step 309, the modality activator activates the registered modality components supported by the device, and connects each modality component directly to the device. In step 310, for the life of the application, results of user interactions are placed on the shared memory area by the modality components. For instance, when a speech input is received and interpreted by a speech input modality component, the component places its interpretation on the shared memory area. In step 311, the inference engine runs against the list of activation conditions and the current state of the shared memory area. In step 312, one or more activation conditions that match against the current state of the memory area are selected. The selected activation conditions determine the operations the modality components are to perform.

In step 313, the application module adds and/or removes activation conditions from the list of activation conditions stored within the activation condition data store. Each submission and deletion of an activation condition also counts as an event that causes the inference engine to run against the new list of activation conditions. In step 314, the modality component performs a programmatic action as a result of its activation condition being selected. The programmatic operation may be, for example, the output of text by the speech output modality component directly to the device. Once the programmatic action has been performed, the method can loop to step 310, where the results of the programmatic engine can be placed on the multimodal engine's shared memory area.

It should be noted that method 300 represents one of a number of possible arrangements consistent with the invention as disclosed. The invention is not to be construed as limited to the exact details specified in the method 300 and many variations of the illustrated method that are consistent with the disclosed inventive arrangements can be used by one of ordinary skill to achieve equivalent results. For example, the activation conditions for each modality component can be placed on the activation list of the modal component server whenever the modality components are registered and not as specifically detailed in FIG. 3.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, hi any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for managing distributed multimodal interactions comprising:
   registering a plurality of distributed modality components with a modality component server, wherein each modality component handles an interface modality for one or more applications, wherein each modality component places a set of activation conditions in a shared memory area of the modality component server, wherein the set of activation conditions defines how the modality component is activated and how input and output between the modality component and a client device is started and stopped, wherein activation conditions are added and/or removed by an application module;
   receiving, from a first multimodal application, activation conditions for at least one of the modality components that the first multimodal application supports;
   matching the activation conditions submitted by the first multimodal application with activation conditions stored in the shared memory area by an inference engine of the modality component server;
   activating a modality component, by a modality activator of the modality component server, when the set of activation conditions for said modality component is satisfied by the activation conditions submitted by the first multimodal application;
   connecting said activated modality component to a client device on which the first multimodal application is executing; and
   disconnecting the activated modality component from the client device and deactivating the modality component by the modality activator upon completion of an interaction response.

2. The method of claim 1, wherein at least one of the plurality of distributed modality components provides a speech based modality.

3. The method of claim 1, wherein the modality component server comprises an interface that converts data conveyances from a format compatible with the activated modality component to a format compatible with the first multimodal application.

4. The method of claim 1, wherein at least one of the plurality of distributed modality components provides a speech input modality.

5. The method of claim 1, wherein at least one of the plurality of distributed modality components provides a synthetic speech generation modality.

6. The method of claim 1, wherein the client device comprises a cellular telephone, and wherein the modality component server comprises an interface that is compatible with the cellular telephone.

7. At least one non-transitory computer readable medium encoded with instructions that, when executed by a computer system, perform a method for managing distributed multimodal interactions, the method comprising:
registering a plurality of distributed modality components with a modality component server, wherein each modality component handles an interface modality for one or more applications, wherein each modality component places a set of activation conditions in a shared memory area of the modality component server, wherein the set of activation conditions defines how the modality component is activated and how input and output between the modality component and a client device is started and stopped, wherein activation conditions are added and/or removed by an application module;
receiving, from a first multimodal application, activation conditions for at least one of the modality components that the first multimodal application supports;
matching the activation conditions submitted by the first multimodal application with activation conditions stored in the shared memory area by an inference engine of the modality component server;
activating a modality component, by a modality activator of the modality component server, when the set of activation conditions for said modality component is satisfied by the activation conditions submitted by the first multimodal application;
connecting said activated modality component to a client device on which the first multimodal application is executing; and
disconnecting the activated modality component from the client device and deactivating the modality component by the modality activator upon completion of an interaction response.

8. The at least one non-transitory computer readable medium of claim 7, wherein at least one of the plurality of distributed modality components provides a speech based modality.

9. The at least one non-transitory computer readable medium of claim 7, wherein at least one of the plurality of distributed modality components provides a speech input modality.

10. The at one non-transitory computer readable medium of claim 7, wherein the client device comprises a cellular telephone, and wherein the modality component server comprises an interface that is compatible with the cellular telephone.

11. The at least one non-transitory computer readable medium of claim 7, wherein the modality component server comprises an interface that converts data conveyances from a format compatible with the activated modality component to a format compatible with the first multimodal application.

12. An apparatus for managing distributed multimodal interactions, the apparatus comprising:
at least one communication interface;
at least one memory to store processor-executable instructions; and
at least one processor coupled to the at least one communication interface and the at least one memory, wherein upon execution of the processor-executable instructions by the at least one processor, the at least one processor:
A) registers a plurality of distributed modality components with a modality component server, wherein each modality component handles an interface modality for one or more applications, wherein each modality component places a set of activation conditions in a shared memory area of the modality component server, wherein the set of activation conditions defines how the modality component is activated and how input and output between the modality component and a client device is started and stopped, wherein activation conditions are added and/or removed by an application module;
B) controls the at least one communication interface to receive, from a first multimodal application, activation conditions for at least one of the modality components that the first multimodal application supports;
C) matches the activation conditions submitted by the first multimodal application with activation conditions stored in the shared memory area by an inference engine of the modality component server;
D) activates a modality component, by a modality activator of the modality component server, when the set of activation conditions for said modality component is satisfied by the activation conditions submitted by the first multimodal application;
E) controls the at least one communication interface to connect said activated modality component to a client device on which the first multimodal application is executing;
F) controls the at least one communication interface to disconnect the activated modality component from the client device; and
G) deactivates the modality component by the modality activator upon completion of an interaction response.

13. The apparatus of claim 12, wherein at least one of the plurality of distributed modality components provides a speech based modality.

14. The apparatus of claim 12, wherein at least one of the plurality of distributed modality components provides a speech input modality.

15. The apparatus of claim 12, wherein at least one of the plurality of distributed modality components provides a synthetic speech generation modality.

16. The apparatus of claim 12, wherein the client device comprises a cellular telephone, and wherein the modality component server comprises an interface that is compatible with the cellular telephone.

17. The apparatus of claim 12, wherein the modality component server comprises an interface that converts data conveyances from a format compatible with the activated modality component to a format compatible with the first multimodal application.

18. The apparatus of claim 7, wherein at least one of the plurality of distributed modality components provides a synthetic speech generation modality.

* * * * *